(12) United States Patent
Kurtz et al.

(10) Patent No.: US 11,589,131 B1
(45) Date of Patent: Feb. 21, 2023

(54) TECHNIQUES FOR MODERATING STATE CHANGES OF LIVE EVENT STREAMS

(71) Applicant: Amazon Technologies, Inc., Seattle, WA (US)

(72) Inventors: Doug Kurtz, Austin, TX (US); Rohan Kadam, Austin, TX (US); Samuel Jacob Vercauteren, Austin, TX (US); Eric B Aschner, Round Rock, TX (US); Mani Madhukar Bansal, Round Rock, TX (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 16/915,481

(22) Filed: Jun. 29, 2020

(51) Int. Cl.
*H04N 21/2187* (2011.01)
*H04N 21/488* (2011.01)
*H04N 21/472* (2011.01)

(52) U.S. Cl.
CPC ..... *H04N 21/4882* (2013.01); *H04N 21/2187* (2013.01); *H04N 21/47214* (2013.01)

(58) Field of Classification Search
CPC .......... H04N 21/4882; H04N 21/2187; H04N 21/47214; H04N 21/23424; G06F 16/10; G06F 16/20; G06F 16/21
See application file for complete search history.

(56) References Cited

U.S. PATENT DOCUMENTS

| | | | |
|---|---|---|---|
| 2013/0170819 A1* | 7/2013 | Dykeman | H04N 5/782 386/299 |
| 2019/0028767 A1* | 1/2019 | Larsuel | H04N 21/47214 |
| 2020/0007927 A1* | 1/2020 | Conwell | H04N 21/458 |
| 2020/0236415 A1* | 7/2020 | Khanna | H04N 9/8205 |

* cited by examiner

*Primary Examiner* — Ngoc K Vu
(74) *Attorney, Agent, or Firm* — Kilpatrick Townsend & Stockton LLP

(57) ABSTRACT

A method implemented by a computer system is provided. The method includes receiving one or more event state indicators corresponding to an event state of a content stream, the content stream comprising digital streaming content of a live event. The method also includes determining a state change of the event state based at least in part on one or more confidence level values of the one or more event state indicators. The method also includes ascertaining a risk quotient of the state change, based at least in part on a state change type of the state change, and, based at least in part on the risk quotient, implementing the state change at least in part by storing the state change in a data store in communication with the computer system.

19 Claims, 10 Drawing Sheets

TECHNIQUES FOR MODERATING STATE CHANGES OF LIVE EVENT STREAMS

BACKGROUND

Streaming content of a live event differs from streaming of pre-recorded content in that viewers may prefer to watch the live event in real-time. While latency may introduce a delay between the occurrence of events and their presentation via a digital content stream, real-time viewing indicates presentation in a manner by which the content may not be advanced forward in time, because the data has not yet been provided to the streaming platform. In light of viewer preference for watching live events in real time, it is important to provide accurate information about the state of a live event. Incorrect event state information may lead to viewers missing live events or attending a live stream at the wrong time.

BRIEF DESCRIPTION OF THE DRAWINGS

Various embodiments in accordance with the present disclosure will be described with reference to the drawings, in which.

DETAILED DESCRIPTION

Figure 1:
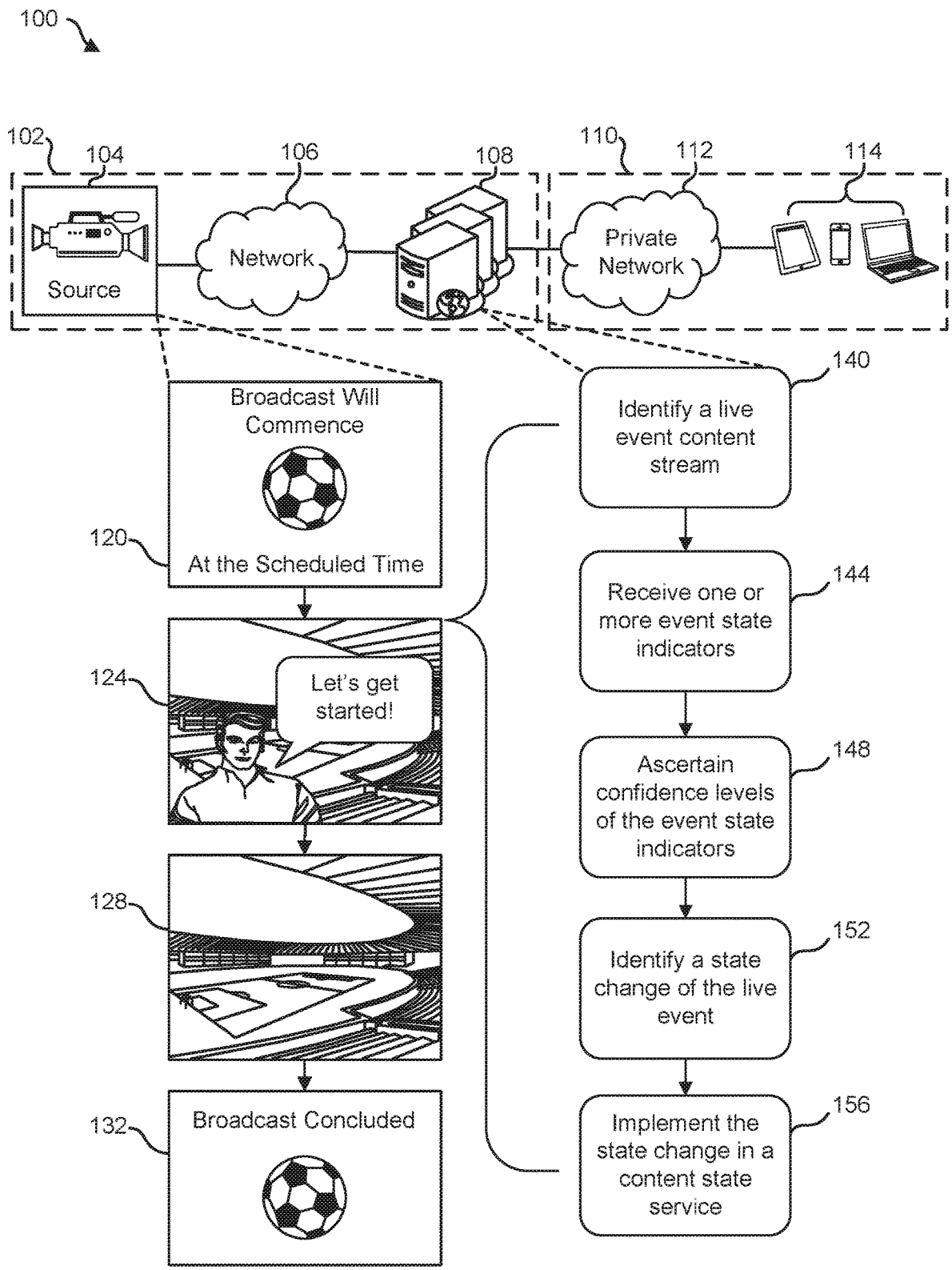
FIG. 1 illustrates an example technique for moderating state changes of a live event content stream, in accordance with one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Digital streaming is one popular method for consumers of entertainment content to access their preferred media sources. Digital streaming is available on a variety of platforms, such as smartphones, tablets, or smart televisions (e.g., televisions that execute native content streaming applications and/or televisions that connect to smart set top boxes), and users of such devices benefit from the convenience and variety of large libraries of content (e.g., movies, television programs, etc.) available on demand. Increasingly, live-streamed content, such as sports, performances, political events, or other forms of live entertainment are being included as part of streaming content offerings on online platforms of digital media. Unlike prerecorded media titles, live event streams are often more important to consumers while they are happening in real-time. Live events become less important to consumers after the events have concluded or if they are postponed. For this reason, live events that are accurately described by an event state are more likely to meet the expectations of consumers and may improve the visibility and interaction with the live-event streams.

In an example, a viewer of a sporting event can access a user interface for a digital streaming platform to select and view a live stream of the sporting event. The user interface can include a tile or other interactive icon presenting the sporting event, for example, using a combination of images and text to identify and describe the sporting event. In the present example, the viewer can check the user interface at a time when the live event is scheduled to start later in that same week, and they may not see the event in the user interface at all. The viewer may check again when the event is scheduled to start later in the same day, and may find the event featured prominently, for example, as an approach to emphasizing its topicality. Once the live stream for the event has begun, the user interface may indicate the change by including a streaming indicator (e.g., a play button) in the user interface. In turn, when a live broadcast begins, the user interface may be updated to indicate that the event is live, for example, by adding an icon to the user interface. During the event, changes to the event state may be reflected by changes in the user interface, so that if the viewer logs out of the interface and later returns, the correct status may be indicated.

Techniques described herein include determining a state of a live event content stream (e.g., whether the live event is scheduled, live, suspended, concluded, etc.) by a computer system and implementing the state change to maintain an updated streaming interface of live event content streams. The computer system may determine the live event state based on an event state indicator received from an indicator aggregation service. In some systems, human moderators can watch live event streams to identify the state of the stream (e.g., whether it is live, postponed, cancelled, etc.) and can update event state information manually. The system may also receive indicators from a number of other automated indicator sources including, but not limited to, event schedules, from third party metadata services, or from direct analysis of the live event stream itself (e.g., by analyzing the images or audio of the stream to identify the state). When multiple indicators are received, the system can select one of the indicators to implement and can send the indicated status to a live event state manager system.

Selection may include determining a consensus amongst the multiple indicators received from the indicator sources, such that a change of the event state can be managed in accordance with a risk assessment of the type of change. Different types of changes may include differing escalation policies that govern when the system may seek secondary validation of the event state by an external change control service. Escalation may be limited to high risk state changes involving disruptions of the live event or other interruptions to the live event stream. For example, live events that are cancelled, suspended, or otherwise disrupted (e.g., the stream data or the broadcast is interrupted by a different stream), may warrant escalation to avoid potentially inaccurate event state information propagating through associated systems of a digital streaming service (e.g., user interfaces, promotional schedules, advertising coordinator systems, etc.). Other types of event state changes may be less likely to cause significant problems in associated systems, and as such may not include escalation.

The system may implement multiple techniques to moderate indicators received for a live event stream. For example, a preset procedure may allow the system to automatically (e.g., without user interaction or involvement) implement an event state indicator, as when the system is configured to directly implement any indicator received from a particular indicator source (e.g., a human moderator may have permission to directly select and implement an event state change for a live event stream). In other cases, the system may implement a rules-based procedure to determine a state change after receiving indicators of an event state. The rules may be dynamic and may be updated based on accuracy measurement in a feedback loop. In this way, indicators received from a trusted indicator source may have more influence over event state selection processes than an indicator received from an indicator source that is not trusted. Trust, in the context of indicators and indicator sources, may be determined as part of a tuning process whereby the system can track the accuracy of indicators over time (e.g., through a cumulative database of event state changes for each indicator source). For example, accuracy may be dependent on multiple factors including, but not limited to, event type, indicator source type, change type, etc. The system may also include a classifier, for example, as an implementation of an artificial neural network, to determine whether an indicator is accurate, based on historical data collected for event state changes and majority determination from amongst multiple event state indicators. In this way, the system may be configured to react to some types of indicators, while analyzing and selecting an indicator when other types or multiple types of indicators are received.

In some embodiments, automated event state determination may improve scalability of live event content stream moderation. Beyond simply replacing a human-moderated approach with computer decision making, embodiments of the system described herein may apply adaptive selection techniques to improve selection accuracy over time, on event-specific and state change-specific levels. For example, a human moderator may be unfamiliar with an event type, and as such may be unable to determine whether a state change has occurred (e.g., a person never having been exposed to a cricket match may be unfamiliar with different stages of the game). By contrast, embodiments of the system described herein may leverage historical state change data from many human moderators, accuracy data for specific event state indicators, and feedback from external change control moderation to tune and improve event state moderation. In this way, event state indicators may be selected based on the event type and the state change being indicated in a manner that potentially optimizes not only accuracy, but also computational resource demands. For example, for state changes that may not implicate a high risk of error propagation (e.g., before the event has begun live broadcast), event state indicators may be relied upon that may represent reduced computational resource demand (e.g., a predetermined schedule). For changes where such event state indicators may be less accurate, additional and/or alternative event state indicators may be relied upon, such as image analysis, external metadata systems, or escalation to a human moderator. In this way, event state changes may be moderated by an appropriate response that can meet the level of accuracy warranted, thereby potentially improving overall system efficiency and performance.

FIG. 1 illustrates an example technique 100 for moderating state changes of a live event content stream, in accordance with one or more embodiments. One or more systems may implement technique 100 to update live event state information relied on by downstream content delivery systems. In FIG. 1, a live event content system 102, which may be a back end system of a digital content platform, prepares and processes live event stream content from a content source 104 (e.g., a digital broadcasting network, an online content platform, etc.). The content source 104 may provide the live event stream content via a network 106 to a stream processing system 108. The network 106 may be a distributed computer network (e.g., a cloud network), such that the stream processing system 108 may include multiple systems connected via the network 106 across multiple geographic regions. The stream processing system 108 may include multiple sub-systems, as described in more detail in reference to FIG. 3, below, for managing event state indicators and maintaining updated event state information for use by downstream systems 110 (e.g., front end systems) that may rely on accurate event state information to maintain dynamic user interfaces. For example, a private network 112 may provide updated event state information to one or more services that generate, present, and/or revise a user interface for use by users accessing the digital content stream of the live event through user devices 114 including, but not limited to smartphones, tablets, smart televisions, personal computers, etc.

A live event, unlike prerecorded content available on demand on a user device 114, can be more relevant while it is underway than before it commences or after it concludes. A live event can represent an aggregation of competitions, such as a tennis tournament or a single competition such as a basketball or baseball game. As such, a content stream of a live event may be described by multiple event states, including, but not limited to "far future," "near future," "stream started," "broadcast started," "started," "ended," "broadcast ended," "stream ended," "cancelled," "ended," etc., and may repeatedly change between the various states in a non-linear manner (e.g., "ended" may precede "started" when a live event stream presents an aggregation of competitions). As an illustrative example, a sporting event may be broadcasted by a content source 104 (e.g., a sports broadcasting network) directly from the site of the live event in real time. The stream processing system 108 may begin to receive data associated with the live event from the content source 104 via the network 106 well in advance of the scheduled and/or actual start of the live event. In such cases, the stream may include a title card (e.g., a logo of the broadcasting network, the sports league, or other indicative information about the origin and/or content of the stream). At such a time, the stream may be described by a "stream started" state 120.

In some cases, sporting events are preceded by one or more types of sports-themed programming (e.g., a "pre-game show" or "pre-match analysis"). The broadcast may start, therefore, with a first type of content 124 including live content that precedes the start of the actual event, but that nonetheless is of significant interest to viewers of the live event, via the private network 112 (e.g., users of the user devices 114). At multiple points in the course of the event, the broadcast, and therefore the stream and the event state, may change. For example, after the first type of content concludes, the broadcast may continue with the sporting event 128 itself, followed by another title card to indicate that the broadcast has concluded 132.

At each point in time where the nature of the event may have changed, an updated event state may describe the instant status of the live-event stream. For example, when the first content begins, the state may be described by "broadcast started" 124 rather than "stream started" 120. Similarly, the start of event content may be described by a "started" state 128, and the event's conclusion by an "ended" state 132. For each transition in the digital content stream, the stream processing system 108 may implement the technique 100, whereby one or more event state indicators are received and an event state is determined and implemented. As described above, accurately identifying the state of a live event may allow the stream processing system 108 to correctly reflect the status of the stream to the front end system 110, so that one or more downstream services (e.g., via private network 112) can receive accurate information and update user interfaces via the user devices 114.

At each transition in the digital content stream, technique 100 may include one or more steps, permitting the downstream services to correctly reflect the event state to viewers of the live event stream. In some embodiments, the stream processing system 108 may first identify a live event content stream (140). The stream processing system 108 may be an autonomous system that tracks a number of live event streams, based, for example, on a schedule of live events maintained in a database of live-event data, as described in more detail in reference to FIG. 3, below. In some embodiments, the stream processing system 108 may be configured to update a live event stream hosted by an external service (e.g., an associated system managing the live event content stream). For example, the stream processing system 108 may be configured to maintain the event state of a particular live event. In such cases, the stream processing system may be configured with specific processes by which technique 100 is to be implemented.

In some embodiments, as the live event stream changes (e.g., from stream started 120 to broadcast started 124), the stream processing system 108 may receive one or more event state indicators 144 (e.g., from a corresponding number of event state indicator sources) from which it can determine that a state change has occurred, for example, by determining a consensus amongst the event state indicators. In some embodiments, the one or more event state indicators correspond to one or more confidence level values 148 that may be ascertained by the stream processing system 108 as part of determining the consensus. In some embodiments, the confidence levels for the one or more indicators are based at least in part on historical data collected and stored in a data store, as described in more detail in reference to FIG. 3, below. For example, a confidence level for a given event state indicator may depend on an accuracy of the indicator (e.g., an indicator describing a "broadcast started" state) for the type of event and type of state being indicated. In some embodiments, historical data may be used to determine confidence levels for an indicator source (e.g., a source of the indicator) in a context of the type of event and the state being indicated.

As an illustrative example, an event state indicator describing a weather delay for an indoor event may correspond to a low confidence level, based on an absence of similar event state indicators from historical indicator data. Similarly, an event state indicator provided by a predetermined schedule describing the end of a tournament finale may correspond to a low confidence level, when historical event state data indicates a trend that similar events have ended later than scheduled (e.g., by running into stoppage time or overtime). Additionally and/or alternatively, the confidence level may be received by the stream processing system 108 with the event state indicator, for example, as metadata included in event state indicator data. In some embodiments, the confidence level received with the event state indicator may serve as an input to a multi-parameter model used to ascertain a dynamic confidence level, of which historical data are also a part. In some embodiments, the confidence level received from the indicator source can be used directly.

In some embodiments, the stream processing system 108 can identify a state change of the live event 152, based at least in part on the event state indicators 144. As described in more detail in reference to FIG. 4 and FIG. 6. When a single event state indicator is received, identifying the state change of the live event 152 may involve attributing the state change indicated as the state change of the live event 152. In some embodiments, as when multiple event state indicators are received, the state change of the live event 152 is identified by a workflow including determining a consensus between the multiple event state indicators and identifying whether the state indicated by the consensus represents a state change, relative to the current state of the live event stream. As described in more detail in reference to FIG. 4, determining the consensus may include one or more approaches whereby the multiple event state indicators are treated to identify the event state including, but not limited to, a procedural approach, an abstracted object-model with a set of preconfigured rules, and/or a classifier algorithm (e.g., a machine learning algorithm trained to classify an event state indicator as likely to be true, using event state data collected from previous event state changes) to classify an event state indicator according to dimensions of a feature space. For example, the feature space may include various characteristics of the live event, the indicator source, the type of event, the type of event state change, etc., within which clusters of event state indicators may be determined and identified as true or false (e.g., similarly described in terms of accuracy or likelihood of correctly describing the event state).

In some embodiments, the stream processing system 108 may implement the state change of the live event 152 in a content state service 156 of the stream processing system 108. Implementing the state change of the live event 152 may include one or more system processes. For example, the stream processing system 108 may directly manage event state changes or may send a tentative state change to a control service when the tentative state change is deemed a "high risk" change (as described in more detail in reference to FIG. 2). Additionally or alternatively, the stream processing system 108 may implement a training mode (e.g., a "shadow mode" or "audit mode") whereby implementation of an event state may not be propagated to downstream systems (e.g., front end system 230), but rather can be stored as prospective training data while event state changes can be managed by an external change control service.

Figure 3:
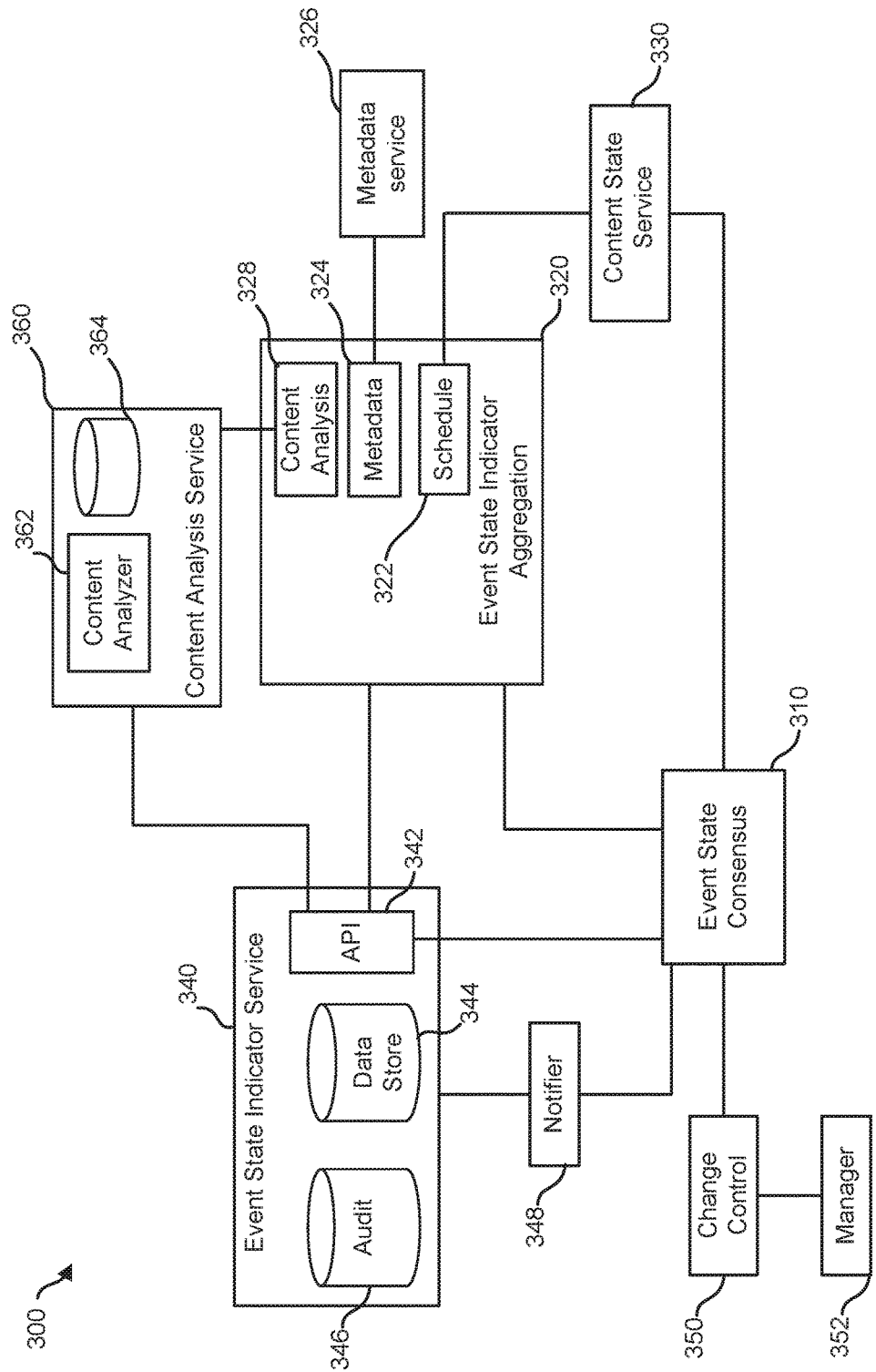
FIG. 3 is a block diagram illustrating an example system for moderating state changes of a live event content stream, in accordance with one or more embodiments.

As described in more detail in reference to FIG. 3, implementing the state change of the live event 152 may include, but is not limited to, updating a database of event state data for the live event, such that the up to date event state can be accurately provided to all downstream systems. For example, a user interface configuration subsystem may automatically (e.g., without user interaction) request the updated event state data for a given event from the event state database, potentially to be used to tailor the features of the user interface to reflect changes in the event state.

Figure 2:
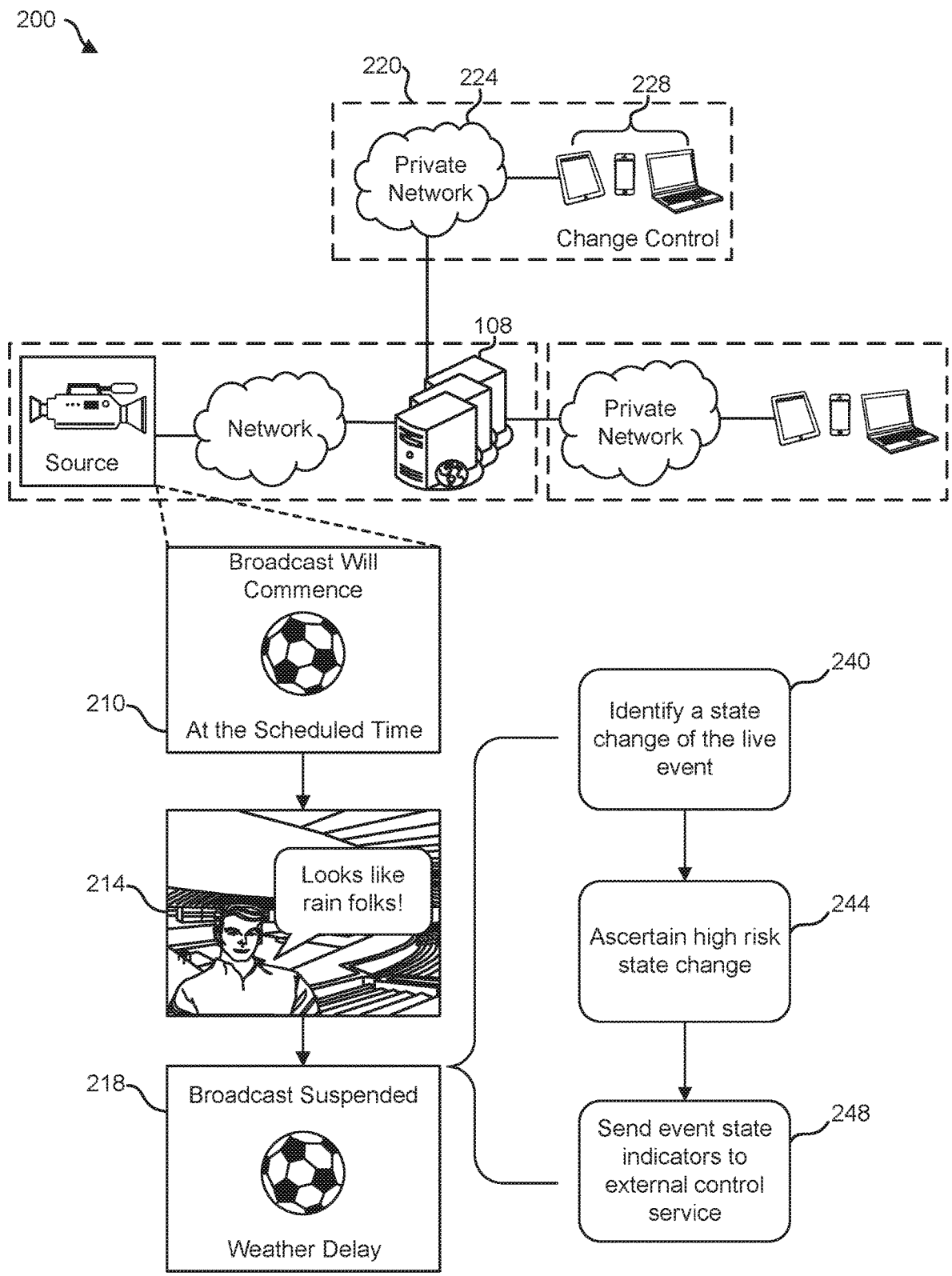
FIG. 2 illustrates an example technique for moderating high risk state changes of a live event content stream, in accordance with one or more embodiments.

FIG. 2 illustrates an example technique 200 for moderating high risk state changes of a live event content stream, in accordance with one or more embodiments. In some embodiments, when a state change is identified (e.g., as expected by a predetermined event state schedule, or by identifying the state of the live event), a risk analysis may be performed to identify whether implementing the indicated state change can risk propagating potentially erroneous event state data to downstream systems (e.g., front end system 120 of FIG. 1). In such cases, content delivery may be improperly affected by an incorrect event state (e.g., live events may be improperly removed from user interfaces or otherwise indicated as unavailable). For that reason, escalation procedures may include a secondary review of event state changes by an external control service.

As described in more detail in reference to FIG. 1, "low risk" changes may be implemented automatically (e.g., by sending and/or storing updated event state data in a database to be accessed by downstream systems). Examples of "low risk" state changes include, but are not limited to changes within the expected bounds of a published schedule 210. For example, an event state change from "far future" to "near future" based on a published event schedule may constitute a low risk of error, at least because relatively few changes in a downstream system will result from the change (e.g., as compared to a change that is accompanied by numerous user interface modifications).

In contrast, event state changes posing a "high risk" of error may be submitted to an external change control service 220 for validation and/or implementation. In some embodiments, event state indicators that represent a disruption of the live event can pose a significant risk of error propagation, at least for the reason that multiple downstream system may rely on event state data to update front end systems. For example, if the event state indicates that an event is live 214, while an event state indicator indicates the event is suspended 218 (e.g., representing an event state change from "live" to "suspended"), the stream processing system 108 may escalate the indicated event state change to the external change control service 220 before moving the event/event item to the suspended state. The external change control service 220 may include, but is not limited to, manual validation by one or more human operators and/or secondary validation by external analysis systems. In some embodiments, the external change control service 220 may include a private network 224 (e.g., a cloud network not connected to the world wide web) through which one or more user devices 228 communicate with the stream processing system 108. In some embodiments, the manual validation may include a human moderator receiving the live event content stream and the event state indicators (e.g., at a user device 228) and may manually validate the event state change and/or implement the event state change directly.

As an illustrative example, while the event is in the live state 214, content visible in the stream may indicate that the stream will be suspended and/or disrupted where a suspension is not included in the schedule (e.g., an announcer or broadcaster declaring "looks like rain folks!") such that one or more event state indicators may be received by the stream processing system 108 (e.g., from an external event metadata provider as described in more detail below). Similarly, the content stream may change from a broadcast feed to a slate 218 or title card to indicate that the event is suspended. In some embodiments, instead of the slate 218, the stream may present content corresponding to a different live event taking place at the same time (e.g., in a tournament of multiple matches underway in parallel, or, in league play where multiple matches take place simultaneously in different geographical locations). As such, a predetermined schedule will not reflect an unplanned disruption, while the stream processing system 108 may receive dynamic and/or reactive event state indicators that may track the real time changes in event state. In the example, because it may be possible to determine whether an event state has changed by analyzing the image stream for visual data (e.g., at least in part by using facial recognition to identify players or optical character recognition to identify participating teams, clock information, match progress, etc.), such a transition from live to suspended may stimulate the stream processing system 108 to escalate the event state indicator to the external change control system 220. In some embodiments, high risk changes, such as disruption state changes, may be identified as such when submitting the change to the external change control system 220. In some embodiments, an edge case (e.g., an event state indicator that is typically low risk but may not be low risk in a specific instance) may also be addressed by the external change control system 220. For example, an event state indicator being received when there are pending indicators being processed by the external change control system 220 for the same event may be considered an edge case.

In the example above, when the stream processing system 108 receives one or more event state indicators for a live event content stream, the stream processing system 108 may first identify a state change of the live event 240. Based on the state change, it may ascertain a risk quotient for the change, as described in more detail below, and may determine that the state change indicated is a high risk state change 244. In some embodiments, the determination that the state change is a high risk state change 244 may include a comparison to a risk threshold. For example, the risk quotient may permit for the determination of edge cases (e.g., when the risk quotient approaches or equals the risk threshold, but does not fall outside the allowable risk threshold for automated consensus). As an illustrative example, an event state change may indicate a disruption of the live event (e.g., a weather delay to an outdoor sporting event) while the event is live 214. In response to determining that the event state indicated (e.g., suspended) involves a high risk state change 244, the stream processing system 108 may escalate the event state indicator to the external change control service 220 (e.g., as a submitting process 248).

FIG. 3 is a block diagram illustrating an example system 300 for moderating state changes of a live event content stream, in accordance with one or more embodiments. The system 300 describes example subsystems for implementing the functions of the stream processing system 108 of FIGS. 1-2. The example subsystems may be constituted in a distributed computing system (e.g., a cloud network) and/or as one or more dedicated computer systems and/or user devices. Similar to the steps described in reference to FIGS. 1-2, an event state consensus 310 subsystem may receive one or more event state indicators from an event state indicator aggregation 320 subsystem. The event state indicators may be received in real time as they are provided from the indicator data sources. Alternatively, the event state indicators may be received asynchronously, as described in more detail in reference to FIG. 4, whereby event state indicators received within a window of time may be presumed to relate to the same event state change being indicated, and as such as may be processed together by the event state consensus 310. As part of example system 300, a content state service 330 subsystem can maintain a predefined schedule of event states for live event streams being processed by the system 300. For example, for a sporting event stream, the content state service 330 may include a series of time points at which an event state change is expected, as well as the corresponding states preceding and following each time point in the series.

The event state consensus 310 may receive event state indicators from the event state indicator aggregation 320, which may include one or more indicator types including, but not limited to, a schedule 322, event metadata 324 provided by a metadata service 326, and/or content analysis 328. In some embodiments, additional or alternative services may be included by the event state indicator aggregation 320, including, but not limited to, human moderation, social media feed data, and/or multiple instances of each indicator type. For example, as described in more detail in reference to FIG. 6, content analysis 328 may include multiple analysis techniques applied to the content stream including, but not limited to pattern matching, image analysis, and/or facial recognition.

As described in reference to FIGS. 1-2 (e.g., technique 100 of FIG. 1 and technique 200 of FIG. 2), the event state consensus 310 may act on the one or more event state indicators by updating an event state indicator service 340 subsystem. The event state indicator service 340 may maintain an updated record of event state changes for multiple events, and may receive the outcome of the decision making process implemented by the event state consensus 310, as described in more detail in reference to FIG. 4. In some embodiments, the event state indicator service 340 may be implemented as an external system, such that the event state consensus 310 can be configured to communicate with the event state indicator service 340 via an application programming interface (API) 342. In some embodiments, the event state indicator service 340 may also include one or more data stores, for example a first data store 344 to maintain updated event state data, and an audit system 346. The audit system 346 may store requested changes that are acted upon (e.g., approved and/or rejected). In some embodiments, the audit system 346 may include the details of the requested change as well as the author of the change.

In some embodiments, the event state indicator service 340 can include a notifier 348 subsystem. The notifier 348 may be configured to publish approved and/or rejected event state changes. For example, one or more services (e.g., downstream services and/or event state consensus 310) may request event state data stored by the event state indicator service 340 (e.g., in data store 344), for which the notifier 348 may provide information about the requested event state. In some embodiments, the content state service 330 may communicate event state information to downstream services. To potentially prevent repeated and/or oscillatory state changes that may introduce downstream instability into the user experience, the content state service 330 may implement an optimistic locking protocol, whereby the content state service 330 may reject an event state determination made by the event state consensus 310 in circumstances when a recently implemented event state change conflicts with the event state determination. For example, the content state service 330 may reject an event state determination that the event is live shortly after the broadcast has started. In such cases, the event state consensus 310 may request event state data again after a predefined timeout period, and may resubmit the event state determination to the content state service 330.

As described in more detail in reference to FIG. 5, below, the event state consensus 310 may be configured to escalate high risk and/or edge case event state indicators received from the event state indicator aggregation 320 to a change control 350 subsystem. As described in reference to FIG. 2 (e.g., change control 220 of FIG. 2) the change control 350 may monitor live event content streams for which the event state consensus 310 has sent event state indicators corresponding to a high risk state change. In some embodiments, the change control 350 may coordinate one or more managers 352 (e.g., a human operator of a user device configured to present the live event stream) whereby the manager may accept or reject the event state change indicated by the one or more event state indicators.

In some embodiments, the change control 350 may interact with the event state indicator service 340 directly, rather than via the event state consensus. For example, a manager 352 may moderate an event state of a live event for which the event state consensus 310 is excluded from managing event state data for the event state indicator service 340. As an illustrative example, a particularly important or infrequent live event (e.g., a tournament final, an international tournament, a one-time live speech broadcast of a world leader, etc.) may involve any event state change falling outside the risk threshold for determining the change as a high risk change (e.g., high risk change 244 of FIG. 2). In such cases, any event state change indicated by the event state indicator aggregation 320 may be escalated by the event state consensus 310 to the change control 350, making direct moderation of event state data by the change control 350 potentially more efficient than implementing the other subsystems of the system 300.

As described in more detail in reference to FIG. 6, below, content analysis indicators 328 may be provided by a content analysis service 360 subsystem. In some embodiments, the content analysis service 360 may include one or more subsystems for receiving, storing, and/or processing live event content streams. For example, the content analysis service 360 may include a data store 364 for storing (e.g., temporary buffered storage) one or more live event content streams for which analysis is undertaken by a content analyzer 362 subsystem. In some embodiments, the content analysis service 360 may communicate with the event state indicator service 340, for example, to identify live event content streams for analysis. In this way, the content analysis service 360 may be recruited to generate event state indicators for a given live event. The content analyzer may implement one or more techniques for analysis of a live event content stream to potentially identify an event state change, as described in more detail in reference to FIG. 6.

In some embodiments, the content state service 330 may receive updated event state information from the event state consensus 310 after an event state change has been identified. For example, the schedule 322 may be modified to reflect event state changes. In an illustrative example, for an event that has experienced a weather delay, future predicted state changes, such as period breaks, post-match broadcasts, etc., may not be expected, despite being in the schedule 322. As such, the schedule 322 may be updated to reflect that the predicted events will not occur, such that the event state consensus 310 does not receive inaccurate event state indicators from the event state indicator aggregation 320.

Figure 4:
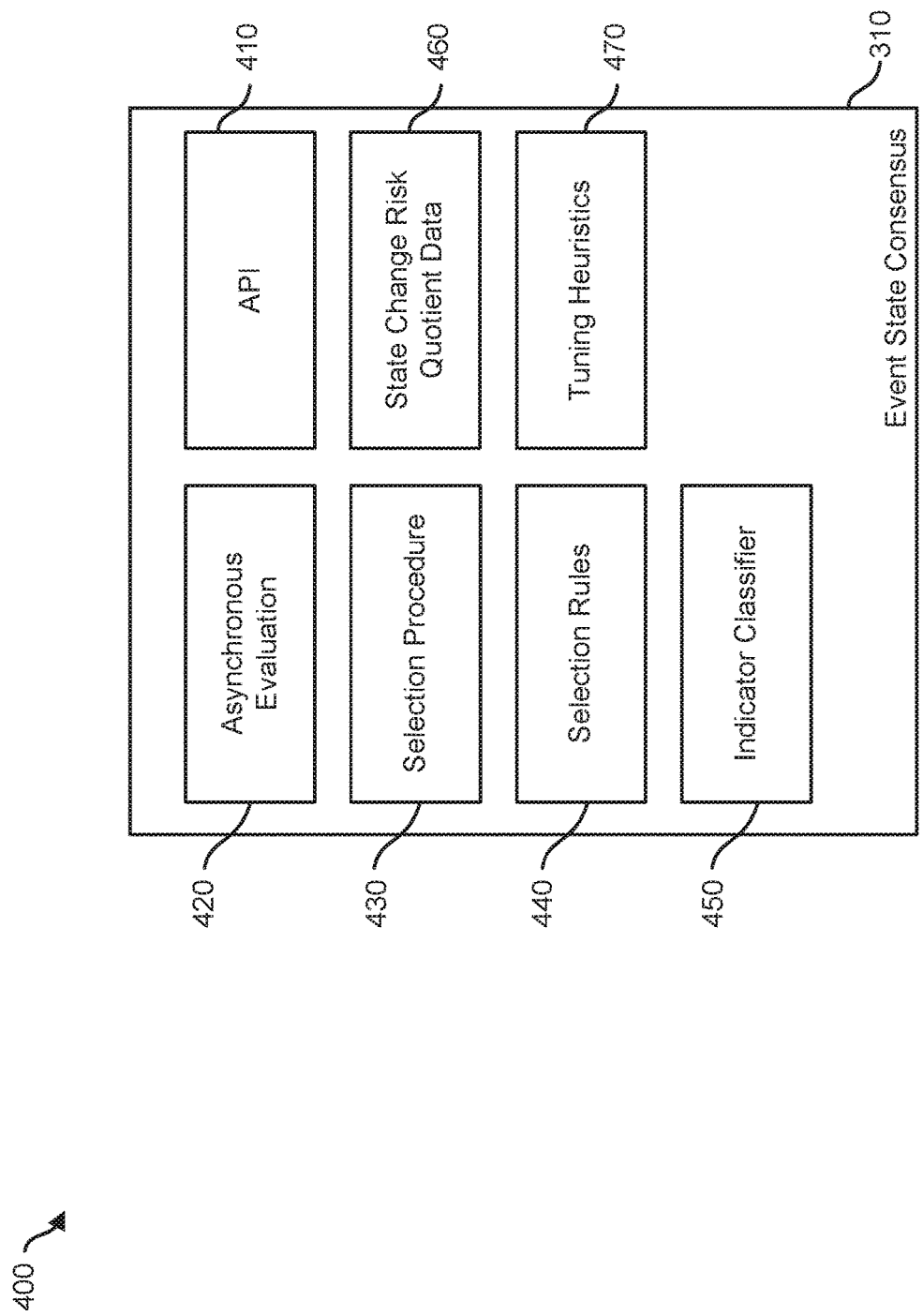
FIG. 4 is a block diagram illustrating an example system for implementing an event state change, in accordance with one or more embodiments.

FIG. 4 is a block diagram illustrating an example system 400 for implementing an event state change, in accordance with one or more embodiments. In reference to the preceding figures, example systems are described for processing a live event content stream to identify event state changes and update the event state provided to downstream services. In example system 400, an event state consensus 310 subsystem can receive one or more event state indicators for a given live event content stream, can identify an event state indicated by the one or more event state indicators, can ascertain a risk quotient associated with the event state change indicated, and can implement the event state change, either by updating an event state indication service or by escalating the event state change to a change control service (although other processes and subsystems are included in some embodiments).

In some embodiments, event state consensus 310 can include sub-elements permitting processing of event state indicators to determine and moderate event state changes, and to communicate changes to external services (e.g., event state indicator service 340 of FIG. 3). In an example, the event state consensus 310 may include an API 410 for communication between subsystems, by which it may receive the event state indicators. Similarly, the event state consensus 310 may include one or more sub-elements for facilitating the moderation of event state indicators.

In some embodiments, the event state consensus 310 may receive multiple event state indicators within a short period of time, which, if processed in sequence, may lead the event state consensus 310 to introduce instability in the live event state database tracking the event state for the live event content stream. Instability, for example, may be caused by multiple event state indicators conflicting with one another, such that implementing each in turn would lead to the event state oscillating between two or more positions. To address the potential instability introduced by receiving multiple event state indicators, the event state consensus 310 may include an asynchronous evaluation 420 sub-element. The asynchronous evaluation 420 may permit pooling event state indicators received during a window of time corresponding to an event state indicator, and evaluating the pooled event state indicators together in, for example, a consensus model. In some embodiments, the window of time may be triggered by one or more events including, but not limited to, the receipt of a first event state indicator, the receipt of a second event state indicator within a period of time after the receipt of the first event state indicator, or if a predefined number of event state indicators are received within a period of time. In some embodiments, the window of time may be defined during configuration of the event state consensus 310 for a given live event type. In some embodiments, the window of time may be dynamic, reflecting the sources of event state indicators received by the event state consensus 310.

As part of processing event state indicators, the event state consensus 310 may include one or more approaches to identify an event state. In so doing, the event state consensus 310 may implement a selection procedure 430, by which an event state indicator is implemented in accordance with one or more preconfigured procedural steps. For example, the preconfigured procedure may include a hierarchical ranking of different indicator types, such that a first indicator type can be automatically implemented unless a second indicator type is received, at which point the second indicator type can be implemented directly, without additional comparison or processing. In an illustrative example, for an outdoor sporting event, a human moderated event state indictor may be given precedence over a predetermined event schedule. In such a case, the selection procedure 430 may include updating event state data in line with the predetermined schedule, unless a human moderated indicator is also received, in response to which the event state consensus may directly implement the human moderated indicator. In a similar manner, procedures for additional and/or alternative event state indicator sources may be provided in the interest of minimizing a risk of erroneous state changes and/or in the interest of reducing unnecessary operations. For example, for a live event type for which the event is expected to proceed according to the pre-defined schedule (e.g., an indoor event with a long history of punctual occurrence) the selection procedure 430 may prioritize the predefined schedule (e.g., schedule 322 of FIG. 3) over other, potentially more dynamic, event state indicators. In some embodiments, a simple majority, or super majority, procedure may be implemented to identify a consensus from amongst multiple event state indicators, whereby an event state may be selected if a majority of received event state indicators identify describe a given event state.

In some embodiments, the event state consensus 310 may implement selection rules 440 to ascertain an event state from the one or more event state indicators. The selection rules 440 may include an object-model with a set of pre-configured rules, such that parameters, features, or other associated data of the one or more event state indicators may be used as inputs to the object model, and such that an event state indicator can be selected as an accurate event state for the live event stream. In this way, interactions between multiple factors may inform the selection of an event state indicator. For example, a rule may define an interaction between an indicator type, an event type, and a state change type, such that an event state indicator source may be prioritized in one circumstance, but not in another. As an illustrative example, an indoor event type may be described by a rule that de-prioritizes event state indicators describing a state change caused by weather events. In this example, another rule may override the de-prioritization if multiple sources indicate the same event state change, whereby the event state consensus 310 may be configured to escalate the event state change to the external change control service.

In some embodiments, the selection rules 440 may be reconfigured based at least in part on tuning of one or more model parameters. For example, state change risk quotient data 460 and tuning heuristics 470 may be applied to adapt the selection rules over time. In some embodiments, tuning of selection rules (e.g., model parameters) may apply to assess an accuracy of an event state indicator source based at least in part on analysis of historical data (e.g., stored by event state indicator service 340 of FIG. 3). In so doing, the treatment of each event state indicator source by the selection rules 440 may be "tuned" to reflect historical accuracy for a given event type and a given event state change, among other factors. In turn, such tuning may improve the ability of the event state consensus 310 to identify an event state change when multiple event state indicators are received. Tuning may be automatic (e.g., without human interaction or implementation), as when feedback loops are incorporated to iterate model parameters.

In some embodiments, the event state consensus may implement an iterative approach to tuning using feedback, heuristics, and confidence values for each event state indicator source. Feedback, in the context of selection rules and tuning, may include receiving (e.g., through notifier 348 of FIG. 3) when an event state change that has been previously selected has been implemented. In some embodiments, feedback received may permit the selection rules to be modified (e.g., modifying one or more object model parameters) to reflect the outcome indicated by the feedback. In turn, the adjustment may permit the event state consensus to optimize an event state indicator source to reflect event state changes for an event type.

In some embodiments, the event state consensus 310 may implement an indicator classifier 450 or clustering algorithm to separate event state indicators received into true or false classes, or into one or more clusters corresponding to features in a feature space. For example, leveraging historical accuracy data (e.g., tuning heuristics 470) and feedback received following previous selections, an artificial neural network implementing supervised and/or unsupervised learning may identify a feature space. Within the feature space, the event state indicators received by the event state consensus 310 may be separated, and an event state indicator may be selected to identify the event state. In some embodiments, the indicator classifier 450 may be trained using historical accuracy data to identify an accurate event state indicator without explicit selection procedures or deterministic selection rules. In some embodiments, the indicator classifier 450 may also incorporate state change risk quotient data 460 to accurately escalate high risk event state changes to an external change control system.

In some embodiments, selecting an event state indicator includes determining a trusted indicator, based at least in part on accuracy and confidence values. The trusted indicator may be considered accurate in a single instance or may be considered accurate prospectively, such that object models, classifiers, and/or procedures may be updated to reflect an algorithmic preference for the trusted indicator. For example, if a content analysis indicator is ascertained as highly accurate, and feedback data indicates a relatively high implementation rate of event indicators (in an event specific and change specific context, for example), the content analysis indicator may be identified as a trusted indicator for a particular selection process and/or for future use by tuning the selection approaches described above.

Figure 5:
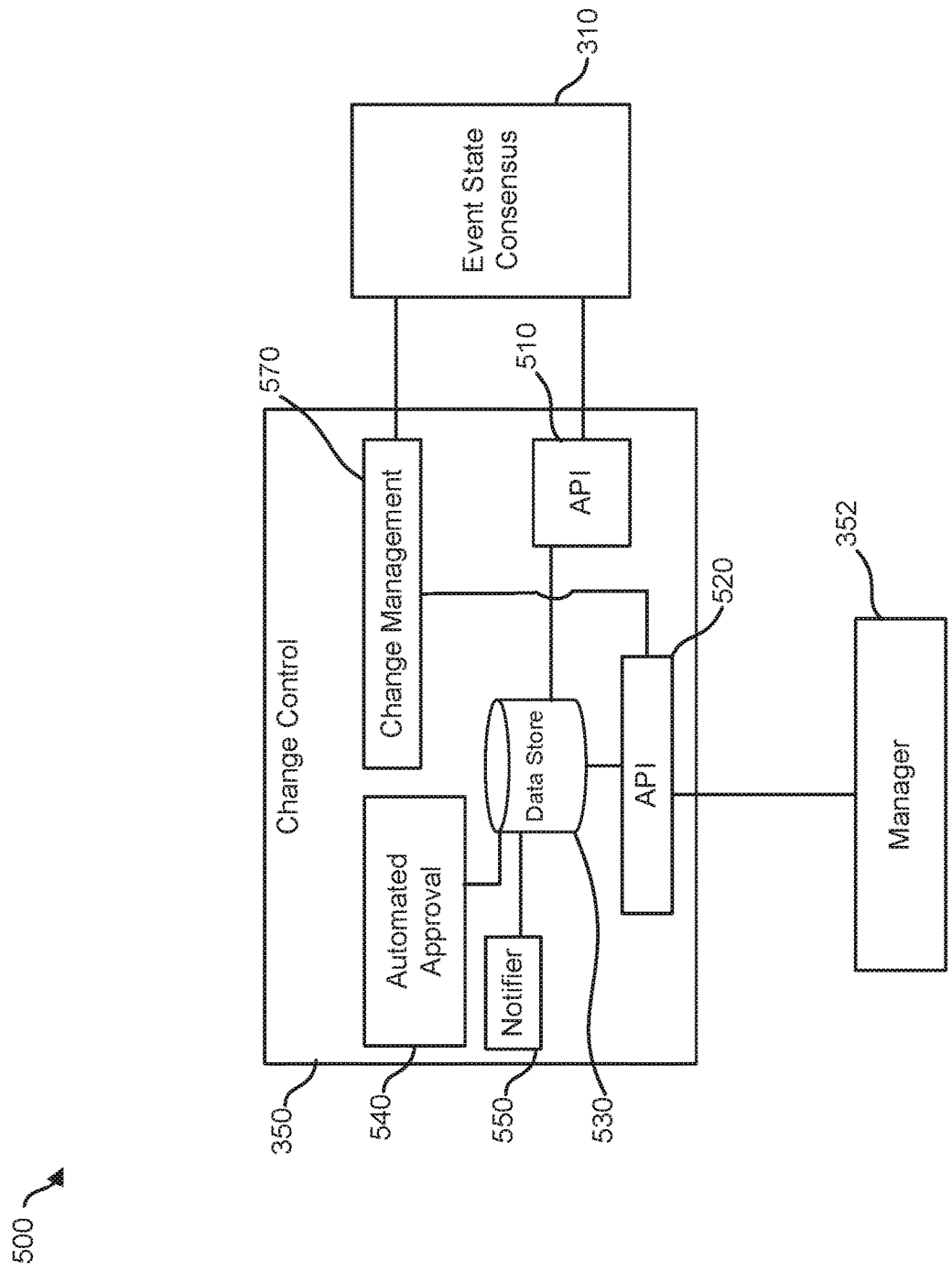
FIG. 5 is a block diagram illustrating an example system for change control by an external change control system, in accordance with one or more embodiments.

FIG. 5 is a block diagram illustrating an example system 500 for change control by an external change control system, in accordance with one or more embodiments. As described in reference to FIGS. 1-4, the example system 500 includes the event state consensus 310 subsystem and the external change control 350 subsystem in communication with the manager 352. In some embodiments, event state changes may represent "high risk" changes that pose a significant likelihood of propagating erroneous event state information to many different downstream services in the event of incorrect selection by the event state consensus 310. For example, event state changes representing disruption of an in-progress (e.g. live state) event may represent a high risk state change, while event state changes representing an expected change before an event has commenced (e.g., advancing from a "far-future state" to an "upcoming" state) may represent a low risk state change. As such, the change control 350 may include one or more elements to facilitate escalation of event state indicators from the event state consensus 310.

In some embodiments, the event state consensus 310 may communicate with the change control 350 via a first API 510, while the manager 352 may communicate with the change control 350 via a second API 520. As part of escalation, the change control 350 may receive event state data from the event state consensus 310 via the first API 510, which may be stored in a data store 530.

Event state data stored in the data store 530 may be accessed and used for automated approval 540. For example, change control 350 may include selection procedures, rules, or other systems similar to those described in reference to FIG. 4, above, to automatically approve or reject event state indicators that have been escalated from the event state consensus 310. In some embodiments, the automated approval may be disabled for specific event content streams or event stream types corresponding to especially important or significant event content. In such cases, change control may be facilitated entirely by the manager 352 (e.g., human moderated event state change approval).

In some embodiments, as part of manager-moderated change control, event state data from the data store 530 is provided to the manager 352 via the second API 520. In some embodiments, the event state data includes updated information related to the event state change received from the event state consensus 350. In some embodiments, a notifier 550 may publish event state changes to downstream services as part of propagating event state data to operations that draw from the event state data (e.g., to update user interfaces). The outcome of the escalation process, for example, by the manager 352, may be returned to the event state consensus 310 as feedback and/or to implement the state change with an event state database (e.g., event state indicator service 340 of FIG. 3). In some embodiments, the change control 350 may implement the event state changes directly, without routing event state data through the event state consensus 310, as when an event includes disabling the event state consensus 310 due to the nature of the event, as described above.

Figure 6:
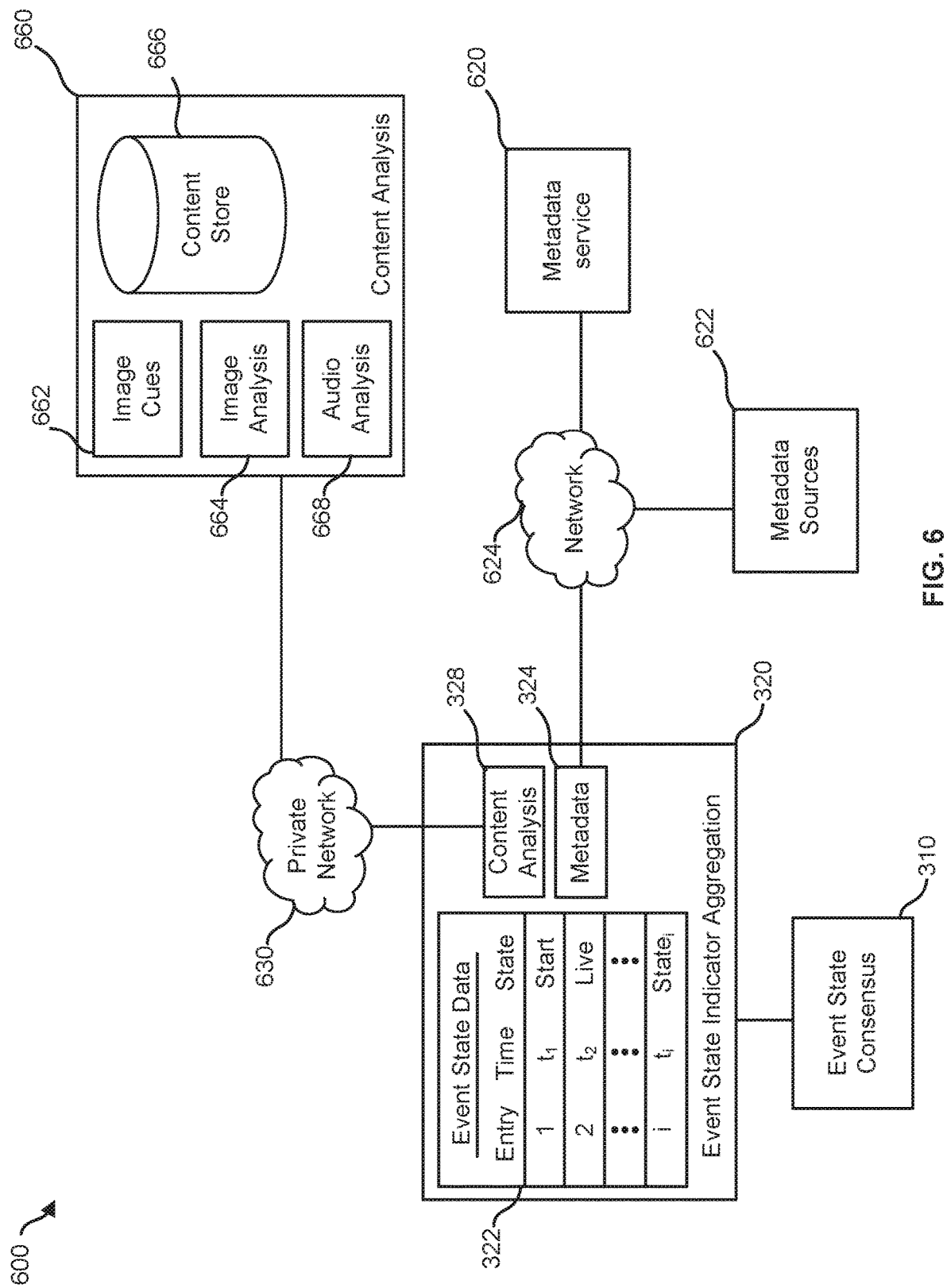
FIG. 6 is a block diagram illustrating an example system for providing one or more event state indicators to an event state consensus system, in accordance with one or more embodiments.

FIG. 6 is a block diagram illustrating an example system 600 for providing one or more event state indicators to an event state consensus system, in accordance with one or more embodiments. The event state consensus 310 may receive event state indicators from multiple different event state indicator sources, as described in more detail in reference to FIG. 3. In some embodiments, the event state indicator aggregation 320 may manage the multiple different sources and may provide relevant event state indicators to the event state consensus 310. The event state consensus 310 may process event state changes for more than one live event content stream by receiving pooled event state indicators from the event state indicator aggregation 320 at discrete times, for example, by implementing an action pipeline or queue of tasks. In some embodiments, the queue may be dynamic, such that event state indicators for important live event content streams (e.g., events drawing a large audience) may be promoted to the front of the queue directly.

Of the different event state indicator sources, a predetermined event schedule 322 may include a set of time points for expected event state changes. As described above, the event schedule 322 may be provided by a content state service (e.g., content state service 330 of FIG. 3), and in turn may be received from the stream content source (e.g., source 104 of FIG. 1). For example, the predetermined event schedule 322 may be derived from a broadcasting schedule received from a broadcaster.

In some embodiments, the types and number of event state indicator sources may be event-specific. For example, some types of events may be sufficiently predictable such that the predetermined schedule 322 may indicate event state changes with a high degree of accuracy. In such cases, the event state consensus 310 may receive the event state indicators based on the schedule alone, permitting the accurate updating of downstream services without requiring additional system processes. Such an approach may improve system operation by reducing computational needs (e.g., not requiring an external change control or a human moderator). By contrast, when a live event cannot be accurately predicted based on the predetermined schedule 322 alone, additional or alternative event state indicator sources may be included.

In some embodiments, the event state indicator aggregation 320 may receive metadata 324 from a metadata service 620. The metadata service 620 may be an external computer system that generates and sends live event metadata to multiple subscribers over a public network 624 (e.g., the world wide web). In some embodiments, the metadata 324 may include granular event state information with a high degree of accuracy. For example, the metadata service 620 may be generated by human viewers of the live event content stream, generating trusted indicator information in real-time for subscriber services. In some embodiments, the metadata 324 may be provided by one or more external metadata sources 622 including, but not limited to, publicly available information published on one or more social media networks. For example, a regularly updated feed of social media posts that may include text, images, and/or audiovisual content may be processed by the event state aggregation 320 to extract event state metadata. In contrast to directly receiving the metadata 324 from the metadata service 620, metadata sources may include granular and/or contextual information that may permit the event state aggregation to provide additional and/or alternative event state indicators. For example, a social media feed may provide an indication that a game is exciting or popular (e.g., based on a number of published posts, a number of users posting about the game, etc.). In another example, posts may include keywords (e.g., hashtags) that may indicate that a star player has been injured, which may be included as part of updates provided to downstream systems.

In some embodiments, content distributors may provide image cues 662 or other detailed information in the live event content stream to permit downstream services to analyze and extract information from the live event content stream that is relevant to the event state. For example, a content distributor (e.g., a national broadcaster) may insert Society of Cable and Telecommunications Engineers (SCTE) markers into a live event content stream by which a regional broadcaster may determine when to interrupt the broadcast with local programming. As such, the event state indicator aggregation 320 may receive content analysis indicators 328 from a content analysis service 660 that similarly identifies the image cues 662 to potentially identify event state changes (e.g., when paired with a schedule of different markers). As another example, an image cue 662 may include one or more visual patterns that can indicate a specific state of the live event content stream (e.g., a broadcaster logo, a sporting event logo or trademark, etc.).

The content analysis 660 may implement image analysis 664 on the live event content stream directly. In some embodiments, a content store 666 may store live event stream data for processing by image analysis 664. The content analysis 660 may operate as a distributed computing system (e.g., a virtual cloud). In some embodiments, the live event content stream can be provided to content analysis 660 via a private network 630.

Image analysis 664 may include, but is not limited to, pattern matching and/or other forms of image recognition. In some cases, the image analysis 664 may include an adversarial machine learning system trained to recognize and identify facial features or other objects and/or features in images of the content stream. For example, in some sporting events, a human face appearing in images may indicate an event state change (e.g., a star player has entered the game, a post-game announcer has appeared in the stream, etc.). In some cases, a specific object or arrangement of people and objects may indicate that a sporting event has begun (e.g., a coin toss may indicate the start of a match). In some embodiments, the image analysis system 664 may be trained to recognize such image features (e.g., by a distractor model).

The content analysis 660 may additionally or alternatively implement audio analysis 668, for example, by using the live event stream data from the content store 666. For example, the audio feed of the live event stream may be isolated from the live event stream data, and may be analyzed using voice and sound recognition tools to identify one or more event state changes, based on the sounds recorded during the live event stream. In some embodiments, this may include, but is not limited to, identifying specific voices (e.g., broadcasters), specific words (e.g., "match point"), or music (e.g., intro fanfare, national anthems, etc.). In this way, the audio analysis 668 may provide additional event state indicator sources, and may permit analysis of the live event stream data at reduced operational cost, based on processing audio in isolation from image analysis.

In some embodiments, event state indicator sources may be managed for different purposes. For example, some sources may be more trusted when indicating a disruption than others. As an illustrative example, a real-time metadata source may be more accurate when indicating an unexpected disruption in a live event than a predetermined schedule. As such, when a trusted source indicates a disruption, the trusted source may be passed to the event state consensus by the event state indicator aggregation 320 directly. As described above, the trusted source may be identified by a confidence level provided by the event state indicator source.

In some embodiments, event state indicator sources can be managed at a time of onboarding live event types as part of an event state configuration of the event state indicator aggregation 320. In some embodiments, this may include determining sources of event state indicators, as well as event specific image cues 662, metadata sources, and/or event-specific heuristics, and may also include implementing a machine learning model to identify a list of event state indicator sources that may provide sufficient accuracy.

Figure 7:
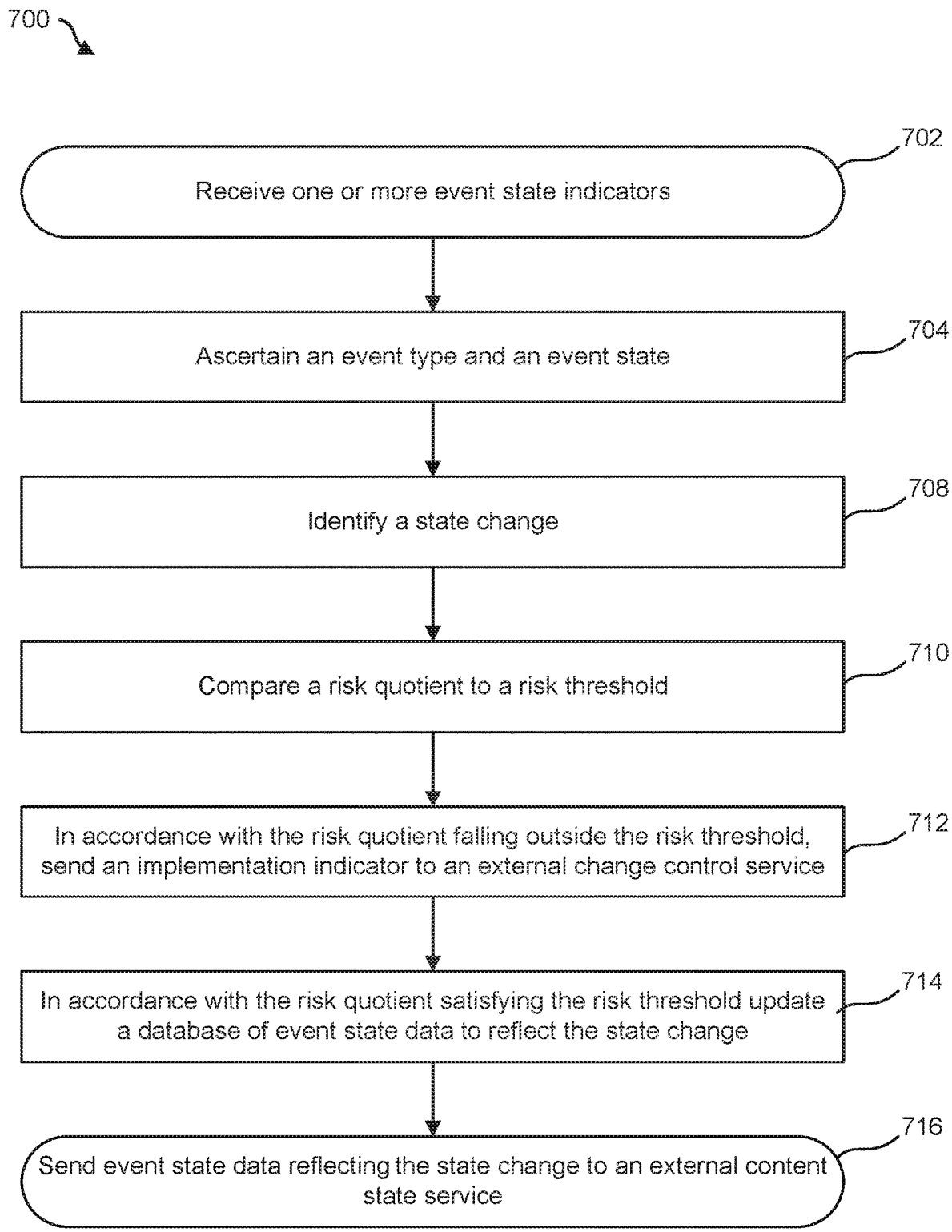
FIG. 7 illustrates an example flow for moderating state changes of a live event stream, in accordance with one or more embodiments.

FIG. 7 illustrates an example process 700 for moderating state changes of a live event stream, in accordance with one or more embodiments. Some or all of the process 700 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In operation 702, the computer system may receive one or more event state indicators. In some embodiments, the event status indicators may describe the event state of a live event content stream provided by a content source (e.g., content source 104 of FIG. 1). As described in more detail in reference to the figures above, the computer system (e.g., stream processing system 108 of FIG. 1) may receive one or more event status indicators from external indicator sources (e.g., metadata service 326 or content analysis service 360 of FIG. 3). Additionally or alternatively, the computer system may receive event state indicators from a predetermined schedule provided by the content source. The computer system may receive the event state indicators at an event state consensus subsystem (e.g., event state consensus 310 of FIG. 3), by which the event state may be determined. The event state indicators may be received by the event state consensus subsystem from an aggregation service (e.g., event state indicator aggregation 320 of FIG. 3), which may implement selection criteria that select event state indicators based at least in part on the event type, event state change, or the like. In this way, the event state consensus subsystem may receive different sets of event state indicators based on the type of event being moderated, as well as the type of event state change being indicated. The event state consensus subsystem may also implement an asynchronous evaluation procedure to potentially reduce repeated iteration between two or more event states. In so doing, event state indicators may be pooled before being processed together, as described in more detail in reference to FIG. 4 (e.g., asynchronous evaluation 420 of FIG. 4).

In operation 704, the computer system may ascertain an event type and an event state of the content stream. As in FIG. 3, an event state consensus of the computer system may ascertain the state of the content stream at least in part by selecting from amongst the one or more event state indicators. As described in more detail in reference to FIG. 4, the event state consensus may implement one or more selection approaches based at least in part on the event type (e.g., the type of event content provided). For example the event state consensus may implement selection procedures (e.g., predefined procedures), selection rules (e.g., based at least in part on an object model with dynamic parameters), and/or a classifier (e.g., as a machine learning algorithm implemented in an artificial neural network), as described in more detail in reference to FIG. 4 (e.g., selection procedure 430, selection rules 440, and indicator classifier 450 of FIG. 4).

In operation 708, the computer system may identify a state change at least in part by comparing the event state of the content stream to the event state ascertained in process 704. While an event state indicator alone may represent a high-risk change, (e.g., a disruption based on an unexpected suspension of the live event, for example), a state change type may be identified by comparing the event state indicated to the event state of the live event content stream (e.g., a transition). The state change thus indicated may permit the computer system to more accurately assess the risk represented by the state change. For example, the computer system may access historical data for events of the same event type to determine whether the state change is likely, thereby providing secondary indication of the likelihood of the identified state change. As an illustrative example, an indoor sporting event may be unlikely to experience a weather delay, In operation 710 the computer system may compare a risk quotient to a risk threshold. As described in more detail in reference to FIGS. 1-3, the risk quotient may be a preconfigured risk level corresponding to an event state change type, provided as a configuration value in a table, stored in memory. In some embodiments, the risk quotient may be a calculated value based at least in part on a numerical model that incorporates numerous parameters including, but not limited to historical accuracy, feedback data, as well as event data reflecting the likelihood of the event state change being indicated.

In operation 712, the computer system may send an implementation indicator to an external change control service, in accordance with the risk quotient falling outside the risk threshold. As described in more detail in reference to FIG. 2, escalation procedures may include sending an event state indicator to an external change control service (e.g., change control 220 of FIG. 2) when the state change indicated is deemed a high risk change. In some cases, the external change control service may be a subsystem of the computer system, including automated approval (e.g., automated approval 540 of FIG. 5) for some types of event state changes, as well as human manager control (e.g., manager 352 of FIG. 3) for others. In some embodiments, the external change control may moderate event state data directly, as when the live event stream is exceptionally significant or important, or in cases where the event occurs infrequently or typically includes unexpected and/or unpredictable event state changes.

In operation 714, the computer system may update a database of event state data to reflect the state change. As described in more detail in reference to FIG. 3, the computer system may update a database of event state data (e.g., event state indicator service 340 of FIG. 3) after determining that a state change has occurred in the live event content stream. For example, a database of state change data may be maintained to provide tuning and improvement data and to publish event state changes to downstream services. As described in more detail in reference to FIG. 4, tuning data (e.g., tuning heuristics 470 of FIG. 4) may be leveraged by the event state consensus subsystem to improve selection approaches, such as object models described above. In some embodiments, the event state consensus subsystem may update the database of event state data, without publishing updates to downstream services (e.g., in an "audit" or "shadow" mode). Such operation potentially permits feedback iteration of the selection approaches to potentially further improve accuracy and efficiency of operation (e.g., in identifying "trusted" event state indicators).

In operation 716, the computer system may send event state data reflecting the state change to an external content state service. As described in more detail in reference to FIG. 3, the external content state service (e.g., content state service 330 of FIG. 3) may maintain event state data for a live event content stream that is used to update downstream services (e.g., front end services 110 of FIG. 1). Updating the content state service may remove inaccurate predicted event state information, such that the event state consensus subsystem does not receive event state indicators (e.g., based on a predetermined schedule) that have been precluded by a disruption event.

Figure 8:
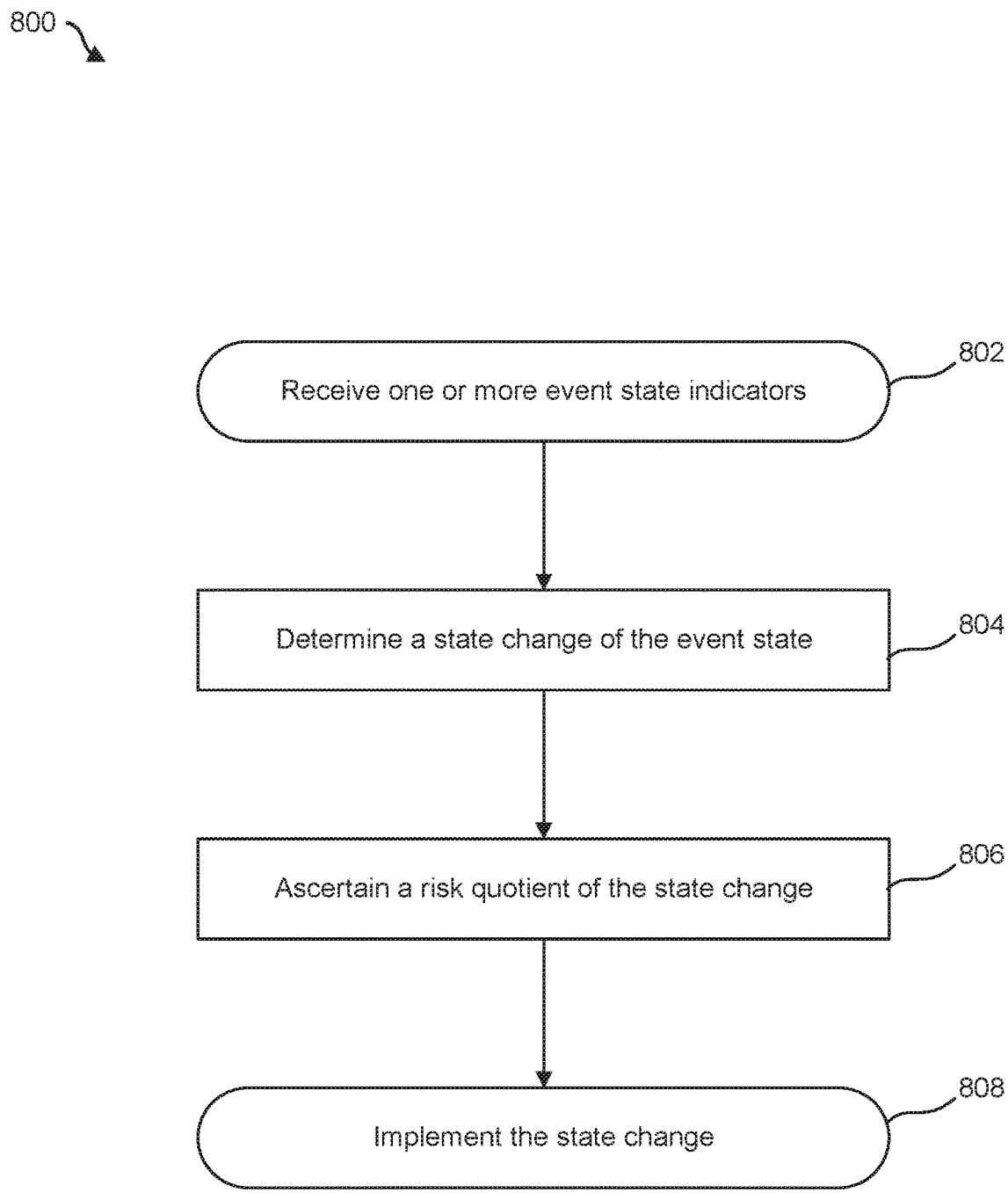
FIG. 8 illustrates an example flow for moderating state changes of a live event stream, in accordance with one or more embodiments.

FIG. 8 illustrates an example flow for moderating state changes of a live event stream, in accordance with one or more embodiments. Some or all of the process 800 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In operation 802, the computer system may receive one or more event state indicators. As described in more detail in reference to the figures above, the computer system may include an event state consensus subsystem (e.g., event state consensus 310 of FIG. 3) that receives one or more event state indicators. The event state indicators may be received according to an asynchronous evaluation procedure (e.g., asynchronous evaluation 420 of FIG. 4), to potentially reduce the likelihood of repeated iteration between two or more event states. The event state indicators may be received from multiple sources, including, but not limited to a predetermined schedule, content analysis, external metadata services, etc.

In operation 804, the computer system may determine a state change of the event state. The state change may be determined by selecting an implementation indicator, for example, by comparing the event state indicators according to a confidence level of each indicator. The confidence level may depend on the event type, the indicator type, as well as other factors that may be live event specific or content specific, as described in more detail in reference to FIG. 3 and FIG. 6. In some embodiments, the confidence level for an event state indicator can be provided by the event state indicator source. In some embodiments, the confidence level can be determined based at least in part on historic accuracy level in an event specific manner. For example, feedback provided from an external audit system (e.g., audit 346 of FIG. 3) may provide improved confidence levels for event state indicators to guide the event state consensus subsystem.

In operation 806, the computer system may ascertain a risk quotient of the state change. Based at least in part on the state change, a risk quotient may indicate whether the state change is a high risk change, a low risk change, or an edge case. As described in more detail in reference to FIG. 2, high risk changes may represent disruptive changes or changes that are not reflected in the predetermined schedule for the live event content stream. For example, the state change may indicate that the live event content broadcast is suspended, whereas the predetermined schedule indicates that the event is ongoing. Low risk changes, by contrast may not indicate a mismatch with the predetermined schedule or may not indicate a disruptive change. Edge cases may be determined in one or more approaches including, but not limited to predetermined procedures (e.g., blacklisting and whitelisting) or numerical models that attribute a numerical risk value to the event state change.

In operation 808, the computer system may implement the state change. As described in more detail in reference to FIGS. 1-4, above, implementing the state change may include multiple approaches based at least in part on the risk quotient determined in operation 806. For example, for high risk or edge cases, the event state consensus subsystem may escalate the event state change to an external change control system (e.g., change control 220 of FIG. 2, and change control 350 of FIG. 3). For low risk changes, the event state consensus subsystem may update a database of event state data directly, and may update an external content state service to reflect event state changes, and to potentially reduce additional inaccurate event state indicators.

Figure 9:
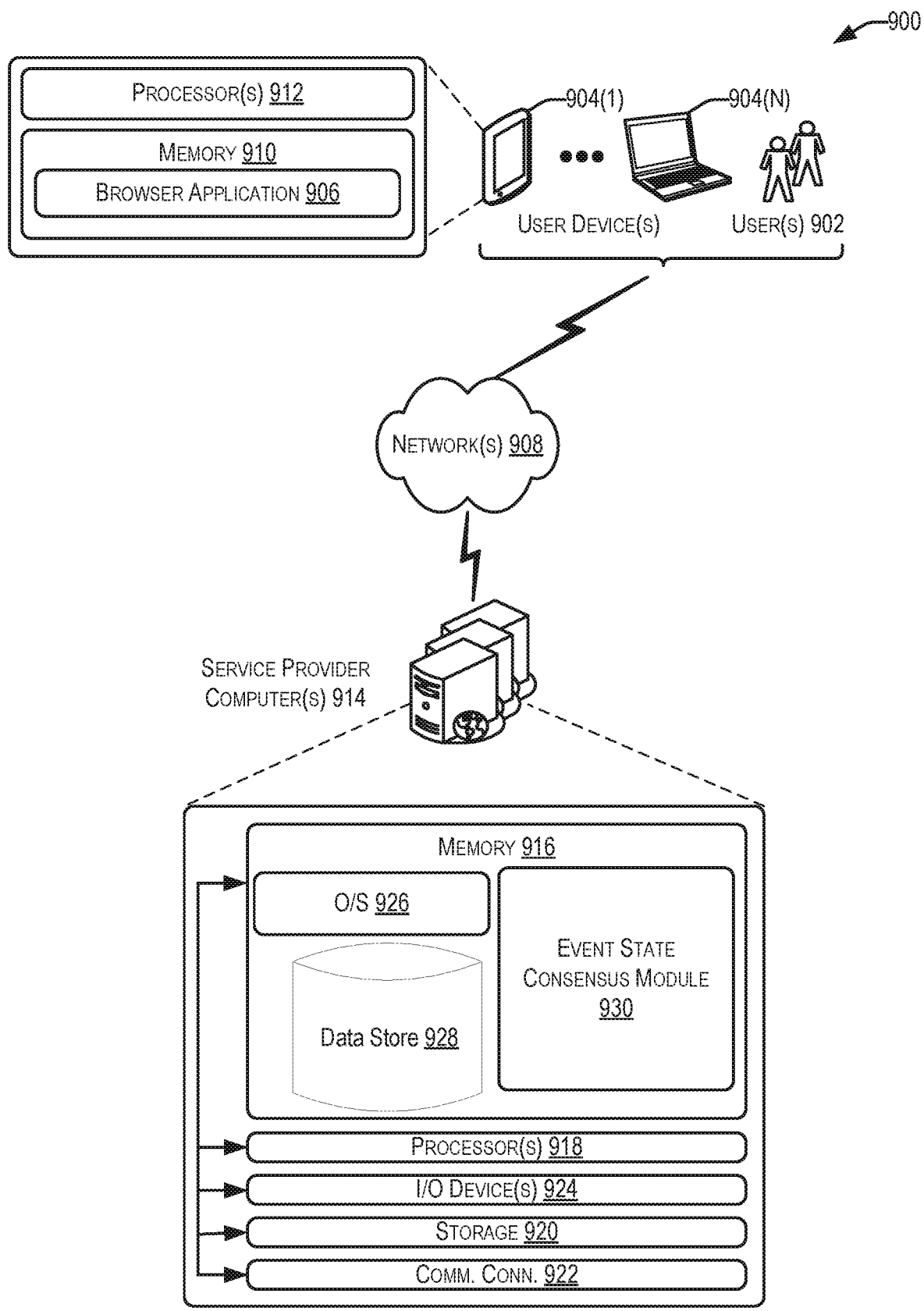
FIG. 9 is a diagram illustrating an example architecture for implementing a live event state moderator feature, in accordance with at least one embodiment.

FIG. 9 is a diagram illustrating an example architecture 900 for implementing an automated up-sampling feature, in accordance with at least one embodiment. In architecture 900, one or more users 902 (e.g., customers, users, consumers, etc.) may utilize user computing devices 804(1)-(N) (collectively, user devices 904) to access a browser application 906 or a user interface (UI) accessible through the browser application 906, via one or more networks 908. The "browser application" 906 can be any browser control or native application that can access and display a network page or other information such as a user interface of a native software application for enabling the selection or interaction of content. A native software application may include an application or program that has been developed for use on a particular platform (such as an operating system) or a particular device (such as a particular type of mobile device or user device 804). In embodiments, the user device 904 may include one or more components for enabling the user 902 to interact with the browser application 906.

The user devices 904 may include at least one memory 910 and one or more processing units or processor(s) 912. The memory 910 may store program instructions that are loadable and executable on the processor(s) 912, as well as data generated during the execution of these programs. Depending on the configuration and type of the user devices 904, the memory 910 may be volatile (such as random access memory (RAM)) and/or non-volatile (such as read-only memory (ROM), flash memory, etc.). The user devices 904 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 904. In some implementations, the memory 910 may include multiple different types of memory, such as static random access memory (SRAM), dynamic random access memory (DRAM), or ROM.

Turning to the contents of the memory 910 in more detail, the memory 910 may include an operating system and one or more application programs or services for implementing the features disclosed herein. Additionally, the memory 910 may include one or more modules for implementing the features described herein including an event state consensus module 930.

The architecture 900 may also include one or more service provider computers 914 that may, in some examples, provide computing resources such as, but not limited to, client entities, low latency data storage, durable data store, data access, management, virtualization, hosted computing environment or "cloud-based" solutions, electronic content performance management, etc. The service provider computers 914 may implement or be an example of the service provider computer(s) described herein with reference to FIGS. 1-6 and throughout the disclosure. The one or more service provider computers 914 may also be operable to provide site hosting, computer application development, and/or implementation platforms, combinations of the foregoing, or the like to the one or more users 902 via user devices 904.

In some examples, the networks 908 may include any one or a combination of many different types of networks, such as cable networks, the Internet, wireless networks, cellular networks, and other private and/or public networks. While the illustrated examples represents the users 902 communicating with the service provider computers 914 over the networks 908, the described techniques may equally apply in instances where the users 902 interact with the one or more service provider computers 914 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 914 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 914 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 914 may be in communication with the user device 904 via the networks 908, or via other network connections. The one or more service provider computers 914 may include one or more servers, perhaps arranged in a cluster or as individual servers not associated with one another.

In one illustrative configuration, the one or more service provider computers 914 may include at least one memory 916 and one or more processing units or processor(s) 918. The processor(s) 918 may be implemented as appropriate in hardware, computer-executable instructions, firmware, or combination thereof. Computer-executable instruction or firmware implementations of the processor(s) 918 may include computer-executable or machine-executable instructions written in any suitable programming language to perform the various functions described when executed by a hardware computing device, such as a processor. The memory 916 may store program instructions that are loadable and executable on the processor(s) 818, as well as data generated during the execution of these programs. Depending on the configuration and type of the one or more service provider computers 914, the memory 916 may be volatile (such as RAM) and/or non-volatile (such as ROM, flash memory, etc.). The one or more service provider computers 914 or servers may also include additional storage 920, which may include removable storage and/or non-removable storage. The additional storage 920 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 916 may include multiple different types of memory, such as SRAM, DRAM, or ROM.

The memory 916, the additional storage 920, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 916 and the additional storage 920 are all examples of non-transitory computer storage media. Additional types of non-transitory computer storage media that may be present in the one or more service provider computers 914 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 914. Combinations of any of the above should also be included within the scope of non-transitory computer-readable media.

The one or more service provider computers 914 may also contain communication connection interface(s) 922 that allow the one or more service provider computers 914 to communicate with a data store, another computing device or server, user terminals, and/or other devices on the networks 908. The one or more service provider computers 914 may also include I/O device(s) 924, such as a keyboard, a mouse, a pen, a voice input device, a touch input device, a display, speakers, a printer, etc.

Turning to the contents of the memory 916 in more detail, the memory 916 may include an operating system 926, one or more data stores 928, and/or one or more application programs or services for implementing the features disclosed herein including the event state consensus module 930. In accordance with at least one embodiment, the event state consensus module 930 may be configured to at least receive one or more event state indicators from one or more indicator sources, as described in more detail in reference to FIG. 3 and FIG. 6, and to select and implement an event state indicator. In some embodiments, the event state consensus module 930 may be configured to escalate an event state indicator to an external change control service. The event state consensus module 930 may be configured to receive the one or more event state indicators by asynchronous evaluation, for example, by pooling event state indicators and moderating the pooled indicators according at least in part to a confidence level that may be dynamic and updated to reflect accuracy of event state indicators on an event type and a state change type. In accordance with at least one embodiment, the service provider computers 914 and event state consensus module 930 may be configured to store event state data in data store 928 or, via networks 908, to distributed data storage systems (e.g. cloud storage systems).

Figure 10:
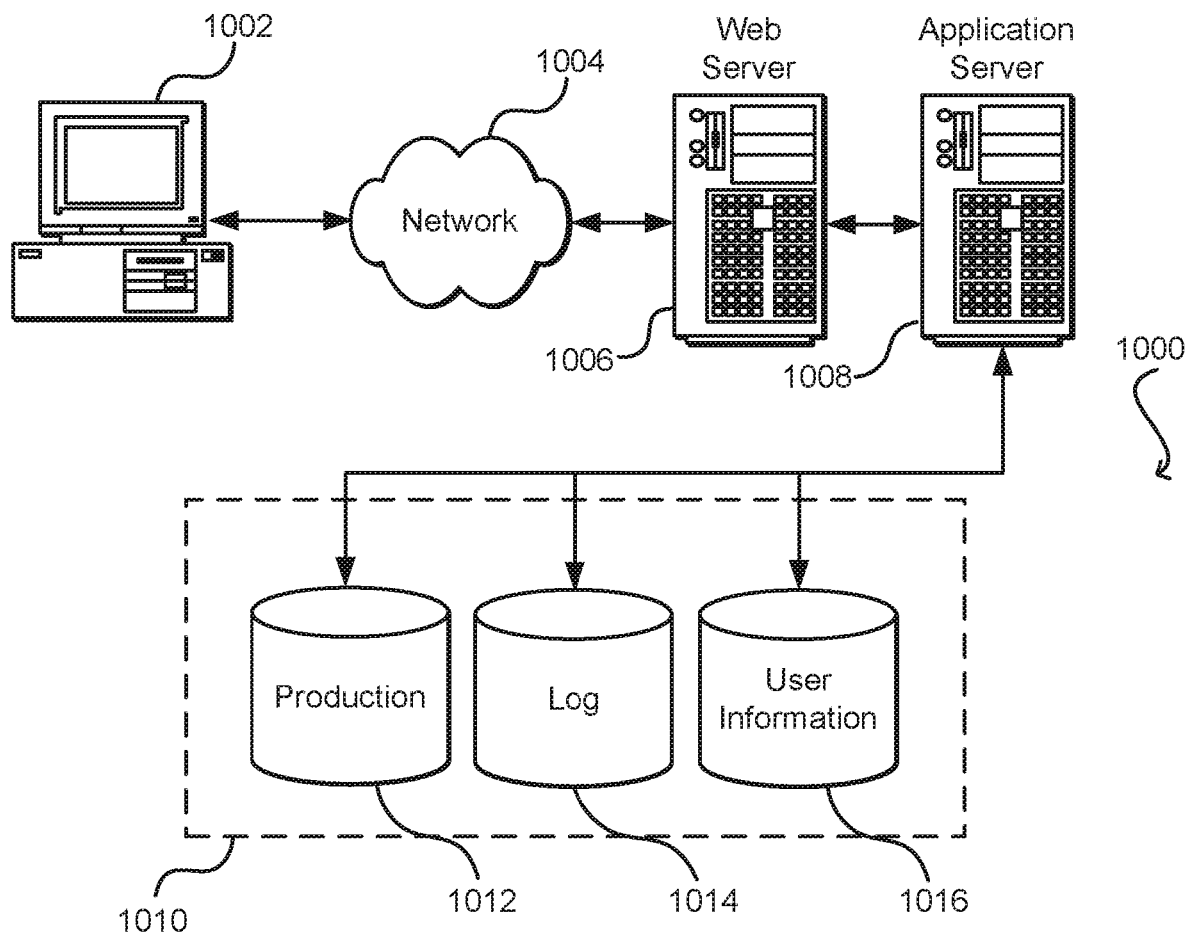
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising
receiving, by a computer system, one or more event state indicators corresponding to an event state of a content stream, the content stream comprising digital streaming content of a live event, and the one or more event state indicators comprising a confidence level;
selecting, by the computer system, an implementation indicator from the one or more event state indicators, the selection comprising:
ascertaining, by the computer system, an event type of the live event and a state of the content stream;
identifying, by the computer system, a state change indicated by the one or more event state indicators at least in part by comparing the one or more event state indicators to the state of the content stream; and ascertaining, by the computer system, a risk quotient of the state change based at least in part on the event type and the state change;

comparing, by the computer system, the risk quotient to a risk threshold;

in accordance with the risk quotient falling outside the risk threshold:

sending, by the computer system, the implementation indicator to an external change control service in communication with the computer system; and in accordance with the risk quotient satisfying the risk threshold:

updating, by the computer system, a database of event state data to reflect the state change, the database of event state data being stored in a data store in communication with the computer system; and sending event state data reflecting the state change to an external content state service in communication with the computer system.

2. The method of claim 1, wherein the one or more event state indicators comprise at least one of: an entry in a predetermined event schedule, a visual analysis indicator, a sport metadata provider indicator, or a live operator indicator.

3. The method of claim 1, further comprising:

receiving one or more tuning heuristics corresponding to the one or more event state indicators, and wherein ascertaining an event type of the live event and a state of the content stream comprises:

determining one or more accuracy values corresponding to the one or more event state indicators based at least in part on the one or more tuning heuristics;

identifying a trusted indicator of the one or more event state indicators based at least in part on a ranking of the one or more accuracy values; and selecting the state of the content stream based at least in part on the trusted indicator.

4. The method of claim 1, wherein receiving one or more event state indicators comprises:

receiving a first event state indicator at a first time;

initiating an indicator submission window at the first time, the indicator submission window being a period of time during which the computer system waits to receive one or more additional event state indicators; and terminate the indicator submission window after the period of time has elapsed.

5. A method, comprising:

receiving, by a computer system, one or more event state indicators corresponding to an event state of a content stream, the content stream comprising digital streaming content of a live event;

determining, by the computer system, a state change of the event state based at least in part on one or more confidence level values of the one or more event state indicators;

ascertaining, by the computer system, a risk quotient of the state change, based at least in part on a state change type of the state change; and based at least in part on the risk quotient satisfying a risk threshold:

updating, by the computer system, the state change at least in part by storing the state change in a data store in communication with the computer system; and sending, by the computer system, the state change to an external change control service in communication with the computer system.

6. The method of claim 5, wherein receiving one or more event state indicators comprises:

receiving a first event state indicator at a first time;

initiating an indicator submission window at the first time, the indicator submission window being a period of time during which the computer system waits to receive one or more additional event state indicators; and terminating the indicator submission window after the period of time has elapsed.

7. The method of claim 5, wherein determining the state change of the event state comprises implementing a procedural selection of an event state indicator of the one or more event state indicators, the procedural selection comprising a predefined order of operations for determining the state change.

8. The method of claim 5, wherein determining the state change of the event state comprises selecting an event state indicator of the one or more event state indicators based at least in part on a set of preconfigured rules, wherein the set of preconfigured rules comprises one or more selection criteria corresponding to the one or more event state indicators.

9. The method of claim 5, wherein determining the state change of the event state comprises selecting an event state indicator of the one or more event state indicators based at least in part on an output of an artificial neural network configured to:

calculate one or more accuracy values corresponding to the one or more event state indicators; and classify the one or more event state indicators as true or false.

10. The method of claim 5, wherein ascertaining the risk quotient of the state change comprises:

ascertaining a state change type corresponding to the one or more event state indicators; and receiving the risk quotient of the state change, the risk quotient corresponding to the state change type, from a database storing a plurality risk quotients corresponding to a plurality of state change types.

11. The method of claim 5, wherein updating the state change comprises:

identifying the state change as a high risk change, based at least in part on the risk quotient of the state change;

requesting a state change validation from the external change control service in communication with the computer system;

receiving the state change validation from the external change control service; and sending the state change to an external content state service in communication with the computer system.

12. The method of claim 5, wherein updating the state change comprises:

identifying the state change as a low risk change, based at least in part on the risk quotient of the state change and the risk threshold; and sending the state change to an external content state service in communication with the computer system.

13. A computer system, comprising:

a memory configured to store computer-executable instructions; and one or more processors in communication with the memory and configured to execute the computer-executable instructions, causing the computer system to undertake one or more steps comprising:

receiving one or more event state indicators corresponding to an event state of a content stream, the content stream comprising digital streaming content of a live event;

determining a state change of the event state based at least in part on one or more confidence level values of the one or more event state indicators;

ascertaining a risk quotient of the state change, based at least in part on a state change type of the state change; and based at least in part on the risk quotient satisfying a risk threshold:

updating the state change at least in part by storing the state change in a data store in communication with the computer system; and sending the state change to an external change control service in communication with the computer system.

14. The computer system of claim 13, wherein receiving one or more event state indicators comprises:

receiving a first event state indicator at a first time;

initiating an indicator submission window at the first time, the indicator submission window being a period of time during which the computer system waits to receive one or more additional event state indicators; and terminating the indicator submission window after the period of time has elapsed.

15. The computer system of claim 13, wherein ascertaining the risk quotient of the state change comprises:

ascertaining a state change type corresponding to the one or more event state indicators; and receiving the risk quotient of the state change, the risk quotient corresponding to the state change type, from a database storing a plurality risk quotients corresponding to a plurality of state change types.

16. The computer system of claim 13, wherein updating the state change comprises:

identifying the state change as a high risk change, based at least in part on the risk quotient of the state change and the risk threshold;

requesting a state change validation from the external change control service in communication with the computer system;

receiving the state change validation from the external change control service; and sending the state change to an external content state service in communication with the computer system.

17. The computer system of claim 13, wherein updating the state change comprises:

identifying the state change as a low risk change, based at least in part on the risk quotient of the state change and the risk threshold; and sending the state change to an external content state service in communication with the computer system.

18. The computer system of claim 13, wherein the one or more event state indicators are received from one or more corresponding event state data sources, and wherein determining a state change of the event state comprises:

ranking the one or more event state indicators based at least in part on accuracy information corresponding to the one or more event state data sources; and selecting an event state indicator of the one or more event state indicators based on the ranking.

19. The computer system of claim 13, wherein the one or more confidence level values are received as metadata corresponding to the one or more event state indicators.

* * * * *